United States Patent
Nogami et al.

(10) Patent No.: US 7,852,525 B2
(45) Date of Patent: Dec. 14, 2010

(54) SURFACE ILLUMINATION UNIT AND TRANSPARENT ORIGINAL READING APPARATUS

(75) Inventors: Ryuji Nogami, Toride (JP); Daisuke Ishizuka, Kawasaki (JP); Kimihiko Fukawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1334 days.

(21) Appl. No.: 11/149,132

(22) Filed: Jun. 10, 2005

(65) Prior Publication Data

US 2005/0275908 A1 Dec. 15, 2005

(30) Foreign Application Priority Data

Jun. 11, 2004 (JP) .............................. 2004-174061
Jun. 7, 2005 (JP) .............................. 2005-166755

(51) Int. Cl.
H04N 1/04 (2006.01)
H04N 1/46 (2006.01)

(52) U.S. Cl. ........................ 358/497; 358/487; 358/488; 358/506

(58) Field of Classification Search ................. 358/487, 358/506, 488, 497
See application file for complete search history.

(56) References Cited

U.S. PATENT DOCUMENTS

| | | | | |
|---|---|---|---|---|
| 5,038,227 A * | 8/1991 | Koshiyouji et al. | ......... | 358/471 |
| 5,414,535 A * | 5/1995 | Kanmoto et al. | ............. | 358/487 |
| 5,724,173 A * | 3/1998 | Chuan | ..................... | 359/210.1 |
| 6,448,995 B1 * | 9/2002 | Fujimoto et al. | ............. | 347/241 |
| 6,771,395 B1 * | 8/2004 | Kito | .............................. | 358/474 |
| 6,788,436 B1 * | 9/2004 | Yoshida et al. | .............. | 358/475 |
| 6,796,502 B2 * | 9/2004 | Nogami et al. | .............. | 235/454 |
| 6,999,210 B2 * | 2/2006 | Uchida | ......................... | 358/475 |
| 7,088,477 B2 * | 8/2006 | Koshimizu et al. | .......... | 358/487 |
| 7,400,429 B2 * | 7/2008 | Ide | .............................. | 358/475 |
| 7,446,909 B2 * | 11/2008 | Hashizume | .................. | 358/474 |

(Continued)

FOREIGN PATENT DOCUMENTS

CN 2241358 Y 11/1996

(Continued)

OTHER PUBLICATIONS

European Communication and Search Report dated Dec. 21, 2007, regarding Application No. 05012469.2-1228.

(Continued)

*Primary Examiner*—Twyler L Haskins
*Assistant Examiner*—Hilina S Kassa
(74) *Attorney, Agent, or Firm*—Fitzpatrick, Cella, Harper & Scinto

(57) ABSTRACT

There is provided an image reading apparatus that can read a plurality of images without troublesome operations by a user, in which a small-size light source with a small electric power consumption is used as an illumination light source used for reading an image of a transparent original. A surface illumination light source having a size large enough to illuminate one image among a plurality of images included in a transparent original is moved sequentially to positions at which the illumination light source can illuminate the respective images. Each image is read while the illumination light source is kept stationary at the position of the image. In addition, at the position of each image, the transparent original is pressed against an original table of the image reading apparatus.

18 Claims, 16 Drawing Sheets

U.S. PATENT DOCUMENTS

| | | | |
|---|---|---|---|
| 7,505,184 B2 * | 3/2009 | Hayashide | 358/497 |
| 2002/0048411 A1 * | 4/2002 | Takayama et al. | 382/275 |
| 2002/0057546 A1 * | 5/2002 | Matsumoto et al. | 361/104 |
| 2002/0057846 A1 | 5/2002 | Saitou et al. | 382/274 |
| 2003/0150918 A1 * | 8/2003 | Nogami et al. | 235/454 |
| 2003/0202222 A1 * | 10/2003 | Amimoto et al. | 358/474 |
| 2003/0202225 A1 * | 10/2003 | Fukawa et al. | 358/506 |
| 2004/0057086 A1 * | 3/2004 | Amimoto et al. | 358/487 |
| 2005/0063025 A1 * | 3/2005 | Hayashide | 358/497 |
| 2005/0111060 A1 * | 5/2005 | Spears et al. | 358/506 |

FOREIGN PATENT DOCUMENTS

| | | |
|---|---|---|
| CN | 1453996 A | 11/2003 |
| EP | 0 707 408 A1 | 4/1996 |
| JP | 1-101063 | 4/1989 |
| JP | 2003-87514 | 3/2003 |
| JP | 2004-7547 | 1/2004 |
| KR | 2001-0043784 | 5/2001 |
| KR | 2003-0067592 | 8/2003 |

OTHER PUBLICATIONS

Korean Notice of Allowance dated Oct. 25, 2007.

* cited by examiner

STOP POSITION OF
BACKLIGHT MODULE

STOP POSITION OF CARRIDGE UNIT

STOP POSITION OF
BACKLIGHT MODULE

STOP POSITION OF CARRIDGE UNIT

STOP POSITION OF
BACKLIGHT MODULE

STOP POSITION OF CARRIDGE UNIT

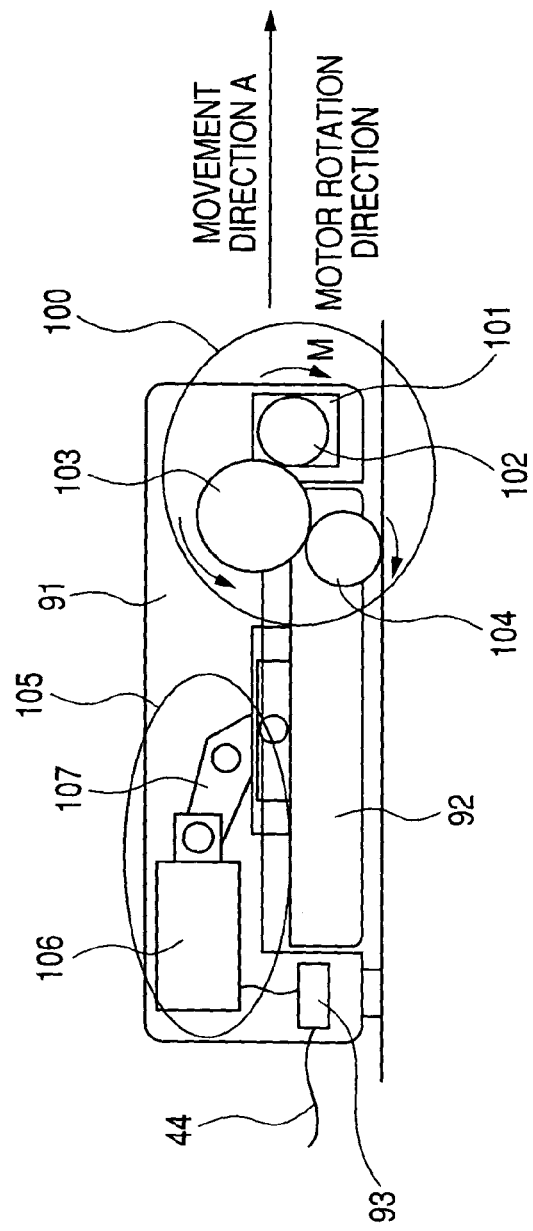
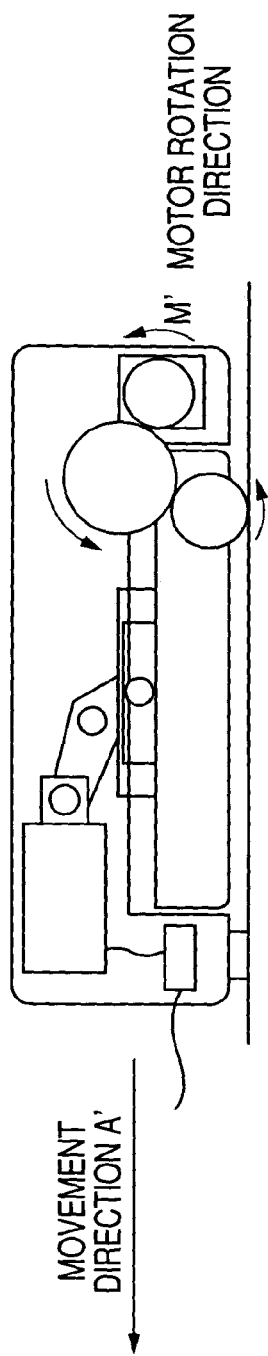
FIG. 7A
FIG. 7B

STOP POSITION OF LIGHT GUIDE PLATE

D0　D11　D21　D31　D41　D51　D61

C0　C11　C21　C31　C41　C51　C61

STOP POSITION OF CIS

SURFACE ILLUMINATION UNIT AND TRANSPARENT ORIGINAL READING APPARATUS

BACKGROUND OF THE INVENTION

1. Field of the Invention

The present invention relates to an image reading apparatus for reading image information of a transparent original such as a photographic film and an illumination apparatus for use in such an apparatus.

2. Related Background Art

In the past, there has been an image reading apparatus that reads an image of a transparent original while illuminating the transparent original by a fixed surface light source as disclosed in Japanese Patent Application Laid-Open No. 1-101063. This image reading apparatus will be described with reference to FIGS. 10A and 10B.

FIG. 10A is a cross sectional showing the image reading apparatus, and FIG. 10B is a perspective view of the same apparatus. A light source for transparent originals 127 is disposed above an original table 121 of the image reading apparatus. At an end portion of a light guide plate 128, a rod-like fluorescent tube 129 is mounted. The fluorescent tube is disposed parallel to the original table 121 on which an original is to be placed. The light guide plate 128 is a light diffusion panel made of a resin. The light guide plate is so constructed that light incident on it from the fluorescent tube 129 is emitted from its original side surface uniformly.

The original table 121 is an original table on which a transparent original such as a photographic film is to be placed. A transparent original placed on the original table is held and fixed between the light guide plate 128 and the original table 121. A CCD is a linear image pickup element which is adapted to convert image information into an electric image signal. A rod lens array 123 is adapted to optically form an image of the transparent original on the CCD 122.

A carriage 124 on which the CCD 122 and the rod lens array 123 are mounted is adapted to be moved in the sub scanning direction along guides 125 and 126. The whole area of the transparent original is illuminated by the light guide plate 128, and image information on the transparent original is read by the CCD 123 through the rod lens array 123. The carriage 124 is moved along the sub scanning direction to read all the image on the transparent original.

Moreover, there has been an image reading apparatus that reads an image of a transparent original while illuminating the transparent original by a moving linear light source, as described in Japanese Patent Application Laid-Open No. 2003-087514. This image reading apparatus will be described with reference to FIGS. 11A and 11B. In FIG. 11A, reference numeral 136 designates an image sensor such as a CCD that functions as photoelectric conversion means to convert image information scanned into an electric signal. The image sensor is disposed in the main body 130 of the image reading apparatus. On the top of the apparatus main body 130, there is provided an original table 131. An original P placed on the surface of the original table 131 is scanned by an image scanning optical system 132 serving as scanning means to expose image information onto the aforementioned image sensor 136. In the image sensor 136, three rows of sensors on which red, green and blue filters are attached are provided to read the image on the original while separating colors. The aforementioned image scanning optical system 132 is composed of a lamp unit 133 and a mirror unite 134 that are moved parallel to the original table 131 for scanning and a lens 135 fixedly mounted in the interior of the apparatus main body 130. The lamp unit 133 is equipped with a white light source L1 and a first mirror M1 for reflecting reflection image light from the surface of the original P illuminated by the light source L1 toward the mirror unit 134. The mirror unit 134 is composed of a second and third mirrors M2 and M3 for turning back the image light having been reflected by the first mirror M1 toward the image sensor 136. In order to keep the optical path length constant all over the image reading area, the lamp unit 133 is moved at a speed twice as fast as the mirror unit 134. Accordingly, the scanning optical system having this type of structure is commonly called a 2:1 scanning optical system. These units are adapted to perform scanning (sub scanning) while powered by a drive source such as a pulse motor (not shown) in synchronization with a reading cycle of the image sensor 136. Reference numeral 137 designates a light source unit for reading transparent originals that serves as illumination means for reading transparent originals. Reference numeral L2 designates a light source disposed parallel to the light source L1 in the main body. Reference numeral 138 designates a semitransparent plate having a light diffusing function. The light source unit for reading transparent originals 137 can be opened/closed with a hinge 139 attached at the rear end of the image reading apparatus being the pivot.

When a transparent original is read, the light source L2 is driven by a drive source (not shown) to scan an area covering the original table 131 parallel to the semitransparent plate 138 in synchronization with the image scanning optical system 132 in the main body. During this process, the light source L1 in the main body is off. Light from the light source L2 is diffused in the semitransparent plate 138 to provide a distribution as shown in FIG. 11B on the surface of the original (FIG. 11B showing portion D1 in FIG. 11A in an enlarged manner). The light on the optical axis from the reading position of the main body of the image reading apparatus to the image sensor 136 is transmitted through the original placed at position P in FIG. 11A and guided to the image sensor 136.

Japanese Patent Application Laid-Open No. 2004-007547 discloses an image reading apparatus as shown in FIG. 12, in which a surface light source for illuminating an area corresponding to one frame of a film is placed manually by a user at the position of an image on a film on the image reading apparatus to read the image of the illuminated frame. In this image reading apparatus 140, a film holder having a slot having a width and a length corresponding to a transparent original 142 is placed on an original table 141, the transparent original 142 is set in the slot, and image reading is performed by scanning by an image reading portion 145 while the transparent original 142 is pressed by an illumination unit 144 for transparent originals from above.

Typically, a film is in the form of a strip including a plurality of consecutive frames, which has been cut from an exposed and developed roll film. According to the above-described method, a user is required to move the illumination unit for transparent originals 144 to another frame position to resume reading every time reading of one frame is completed. The frequency of the above-described operation increases with an increase in the number of the frames of the film to be read. This makes the operation troublesome.

On the other hand, an enlargement of the film reading area and an increase in reading speed are demanded by the market.

In the case of image reading apparatuses using a fixed surface light source, it is necessary to increase the number of lamps and light sources with an enlargement of the illumination area. This necessarily leads to an increase in the weight of the light guide unit itself, to an increase in power consumption and to an increase in the cost. Furthermore, an increase in the warm-up time will result from elongation of the lamp.

Moreover, in the case of image reading apparatuses using a liner, moving light source, with an increase in reading speed, a diving apparatus having a higher degree of accuracy is required for achieving synchronized movement of the light source and the image sensor.

Furthermore, in order to realize radiation with a high degree of uniformity while using point light sources such as LEDs, it is necessary to equip a large number of LEDs. For the above-mentioned reasons, the apparatus will become expensive and require a complicated control process.

In the case of image reading apparatuses using a surface light source for illuminating one frame of a film, it is necessary for the user to place it for each frame.

The present invention has been made in view of the above problems. An object of the present invention is to realize a user-friendly image reading process without requiring highly precise parts nor a highly accurate control process while restricting the peak of power consumption.

SUMMARY OF THE INVENTION

To achieve the above object, the apparatus for reading images according to the present invention is constituted as follows.

An image reading apparatus comprises:
a transparent plate adapted to support an original thereon;
a reading unit adapted to read an original supported on said transparent plate;
a first moving mechanism adapted to move said reading unit to scan said original;
an illuminating unit adapted to illuminate said original; and
a second moving mechanism adapted to move said illuminating unit,
wherein said original is a transparent original including a plurality of images,
said illuminating unit has an area light emitting surface adapted to illuminate an area having a size covering one image area of said transparent original, and
said second moving mechanism is adapted to keep, while said reading unit is reading one image of said transparent original, said illuminating unit at a position at which said illuminating unit illuminates a whole area of said one image and to move, after said reading unit has completed reading of the one image of said transparent original, said illuminating unit to a position at which said illuminating unit illuminates a whole area of another image of said transparent original.

Furthermore, an illuminating apparatus according to the present invention is adapted to illuminates a transparent original including a plurality of images placed on a transparent plate of an image reading apparatus from its surface facing away from said transparent plate, the apparatus comprising:
an illuminating unit adapted to illuminate said original; and
a moving mechanism adapted to move said illuminating unit,
wherein said illuminating unit has an area light emitting surface adapted to illuminate an area having a size covering one image area of said transparent original, and
said second moving mechanism is adapted to keep, while said image reading apparatus is reading one image of said transparent original, said illuminating unit at a position at which said illuminating unit illuminates a whole area of said one image and to move, after completion of reading of the one image of said transparent original by said image reading apparatus, said illuminating unit to a position at which said illuminating unit illuminates a whole area of another image of said transparent original.

Still further, according to the present invention, there is provided a method of controlling an image reading apparatus that illuminates a transparent original including a plurality of images placed on a transparent original table by means of an illuminating unit having a moving mechanism for movement along said transparent original table and reads an image through said transparent original table while moving a reading portion in a scanning manner, comprising the steps of:

reading a whole area of one image included in said transparent original by means of said reading portion while illuminating it by the illuminating unit having an illumination area covering said one image area, the illuminating unit being kept stationary; and controlling said moving mechanism to move said illuminating unit to a position at which said illuminating unit illuminates a whole area of another image among said plurality of images, wherein said reading step and said moving step are performed repeatedly until a predetermined number of times of said reading step is completed.

BRIEF DESCRIPTION OF THE DRAWINGS

FIGS. 7A and 7B illustrate movement of a back light carriage along the sub scanning direction according to the fourth embodiment of the present invention.

DETAILED DESCRIPTION OF THE PREFERRED EMBODIMENTS

First Embodiment

Figure 1A:
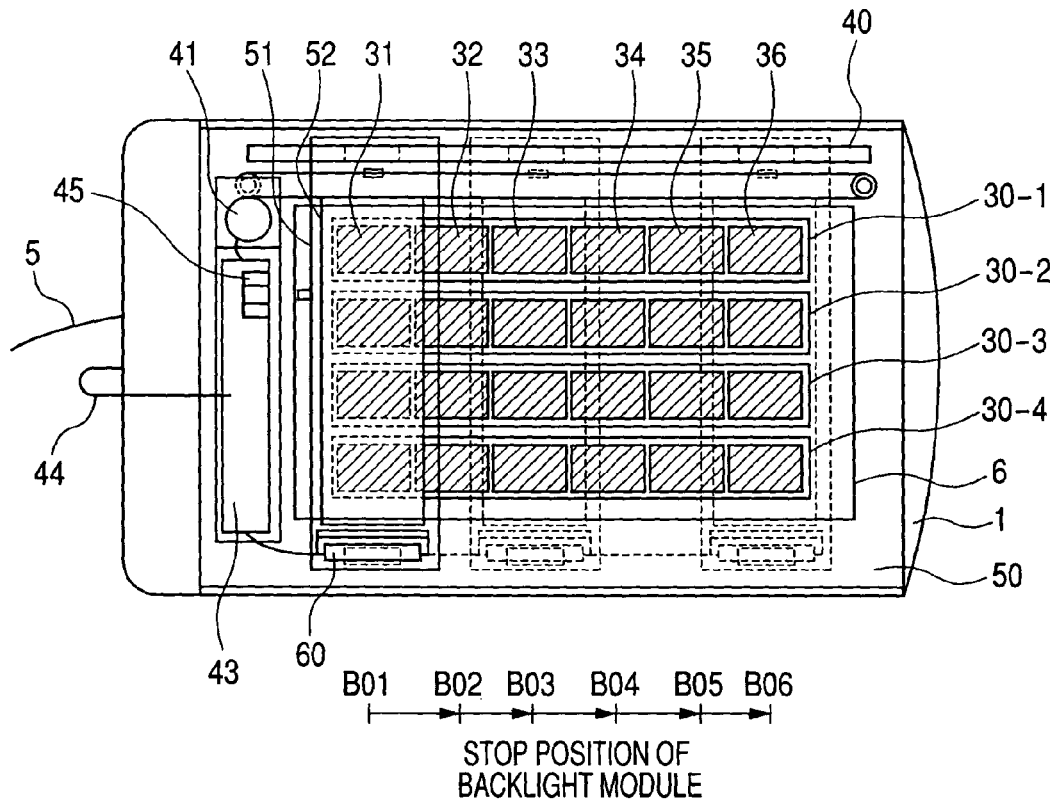
FIGS. 1A and 1B illustrate a first embodiment of the present invention.
Figure 1B:
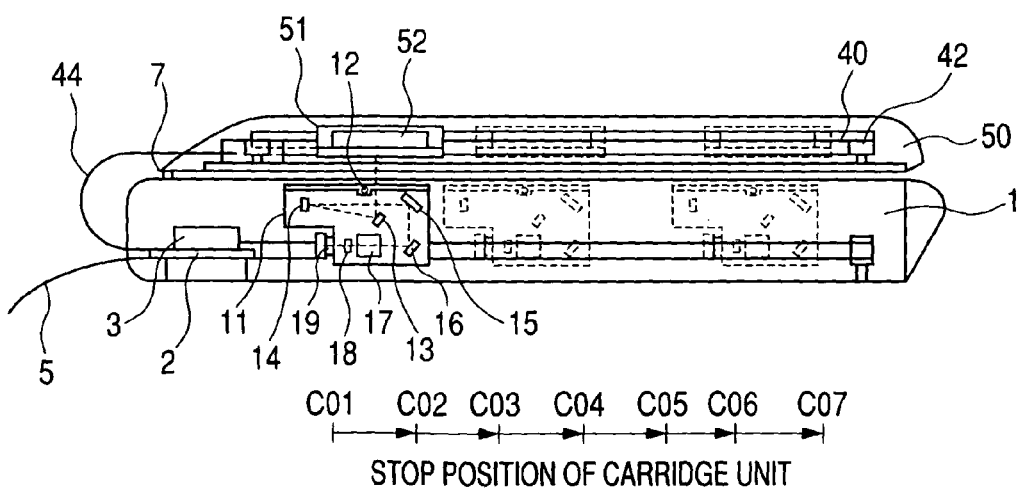

FIGS. 1A and 1B are, respectively, a top view and a side view of an image reading apparatus according to this embodiment. As shown in the top view of FIG. 1A, the image reading apparatus 1 has a transparency unit A designated by reference numeral 50 on a original table 6 that is mounted by a hinge 7 in an openable and closable manner, in order to read a transparent original such as a developed photographic film. In the transparency unit A 50, a back light carriage 51 on which a back light unit 52 and a back light driving board 60 are mounted is provided by means of a shaft 40 for the transparence unit. The back light carriage 51 is connected with a transparency unit driving unit 41 and a timing belt 42, so that the back light carriage 51 can be moved parallel to a transparent original film 30 (30-1 to 30-4) while illuminating it by the back light unit 52.

On the transparency unit A 50, a transparency unit circuit board 43 is fixedly mounted. The circuit board 43 communicates with the image reading apparatus 1 via a main body connection cable 44. The transparency unit circuit board 43 is also adapted to control the transparency unit driving unit 41 and the back light driving board 60. The transparency unit circuit board 43 has a sensor 45 for detecting a home position of the back light carriage 51.

The image reading apparatus 1 is used as an image inputting device for a computer. The image reading apparatus 1 is connected with a computer via an interface such as a USB and performs an image reading scan based on a command by a user entered using an operation portion and display portion of the computer. Commands can also be entered through an operation portion (not shown) of the image reading apparatus.

As shown in the side view of FIG. 1B, in the carriage 11 of the image reading apparatus 1 that includes a light source for reflective original 12, first to fourth mirrors, 13, 14, 15, 16, a lens 17, an optical path length compensation glass 18 and a CCD color line sensor 19 can be moved along the sub scanning direction by a main body drive unit 3. A main body circuit board 2 is fixedly mounted on the image reading apparatus 1. The main body circuit board 2 is adapted to control the main body drive unit 3, the reduction optical system carriage 11 and the transparency unit A 50 via connection cables that are not shown in the drawings.

Figure 2:
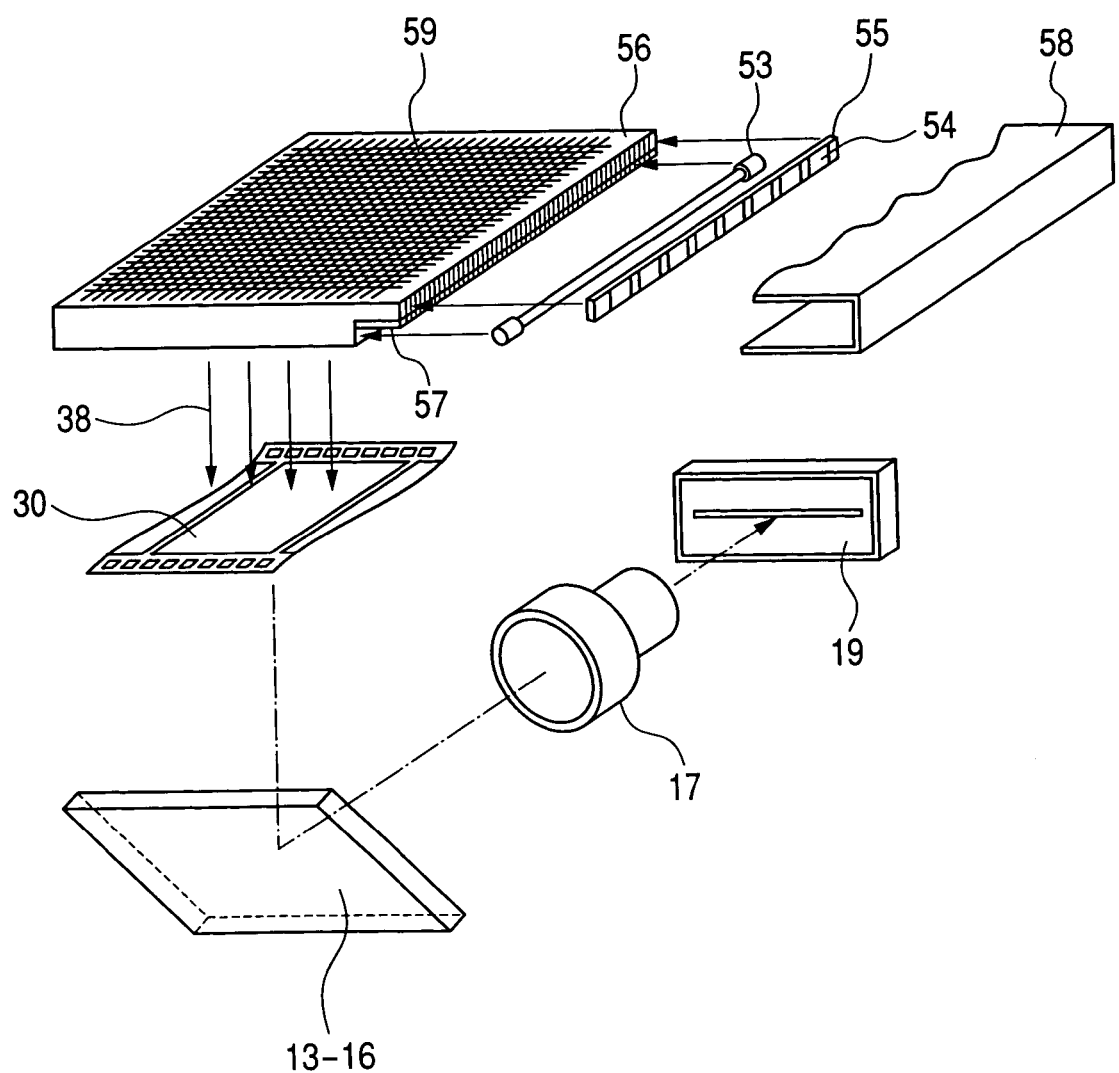
FIG. 2 is a schematic perspective view showing a back light unit according to the first embodiment of the present invention.

FIG. 2 is a schematic perspective view showing the back light unit 52. The back light unit 52 is composed of a light guide plate 56, a lamp for transparent original reading 53 such as a fluorescent lamp or a xenon lamp and an LED board for dust and scratch detection 55 having a plurality of LEDs 54 that emit only light in an infrared range. The lamp for transparent original reading 53 and the LED board for dust and scratch detection 55 are respectively disposed on different parallel surfaces of the light guide plate 56. The light guide plate 56 has a light guide pattern 59 composed of multiple grooves for guiding the light incident thereon to emit illumination light substantially shaped into surface light. A reflection sheet 57 is inserted between the lamp for transparent original reading 53 and the LED board for dust and scratch detection 55 to make it possible to guide the infrared light to the light guide member more efficiently. The area on the surface of the back light unit 52 other than the light emitting area is covered with a reflection sheet 58, and the back light unit 52 can emit surface light 38 having a substantially uniform light amount distribution from its surface illumination area. In this embodiment, the length of the side of the surface illumination area of the back light unit 52 along the sub scanning direction is designed to be a little larger than the longer side of the image area of one frame of a 35 mm film, and so even if there is an error in the set position of a film in the image reading apparatus, an error in the position of an image area on the film or an error in the stop position of the back light carriage 51, illumination can sufficiently cover the image area of one frame of the film. In addition the length of the side of the surface illumination area of the back light unit 52 along the main scanning direction is large enough to cover four image areas of four 35 mm films placed side by side.

In the following, an actual image reading operation will be described with reference to FIGS. 1A and 1B. A transparent original 30 (which is a 35 mm film, here) as an object to be read is set on the original table 6 of the image reading apparatus directly or in a state fixed on a guide (not shown).

The back light unit 52 is moved, while the lamp for transparent original reading 53 is on, from an initial standby position to position B01 that corresponds to the center of the image area 31 of the first frame of the transparent original 30, and then stopped.

The reduction optical system carriage 11 is moved from an initial standby position detected by the sensor 45 to position C01 at which the reading position of the light incident on the first mirror 13 coincides with the start position of image area 31 and to position C02 corresponding to the end position of image area 31. During the movement, surface light 38 emitted from the back light unit 52 is transmitted through the transparent original 30, and delivered to the CCD color line sensor 19 via the mirrors 13, 14, 15, 16, the lens 17 and the optical path length compensation glass 18, so that the light is converted into an output signal. The output signal is transferred to the main body circuit board 2 so as to be converted into image information, and sequentially output to a device such as a computer via an interface cable 5. By the above-described series of operations, image information in image area 31 can be read.

In the time while the reduction optical system carriage 11 is at the end position C02 of image area 31 and image information is being transferred, the center of the back light carriage 51 is moved to position B02 that corresponds to the center of the next image area 32. After the back light carriage has been stopped and the transfer of the image information obtained by reading image area 31 has been completed, the reduction optical system carriage 11 is moved from position C02 to position C03 that corresponds to the end position of image area 32, and image information of image area 32 is read during this movement. Image information of image area 33, image area 34, image area 35 and image area 36 can be read by repeatedly performing the same operation for the respective image areas.

Next, the source of the light is switched to the LEDs 54 and similar operations are performed again, so that infrared image information of image areas 31 to 36 can be read.

According to this embodiment, since the back light carriage 51 and the reduction optical system carriage 11 are moved alternately, the apparatus can operate with a peak electric power consumption approximately half that in the case where both the units are moved simultaneously.

In addition, since the image reading is performed using a stationary surface light source, excellent images free from unevenness in light amount can be obtained by a simple control process without requiring synchronous driving with a high degree of accuracy.

Moreover, even when six frames of images arranged along the sub scanning direction is to be read, the surface light source is required to have an area about as small as only one frame, which is small as compared to the case of fixed surface light source that is required to have a size corresponding to the readable area of six frames along the sub scanning direction. Accordingly, when compared at the same electric power consumption, it is possible in this embodiment to increase the light amount per unit area, and an increase in the reading speed is achieved.

Second Embodiment

Figure 3A:
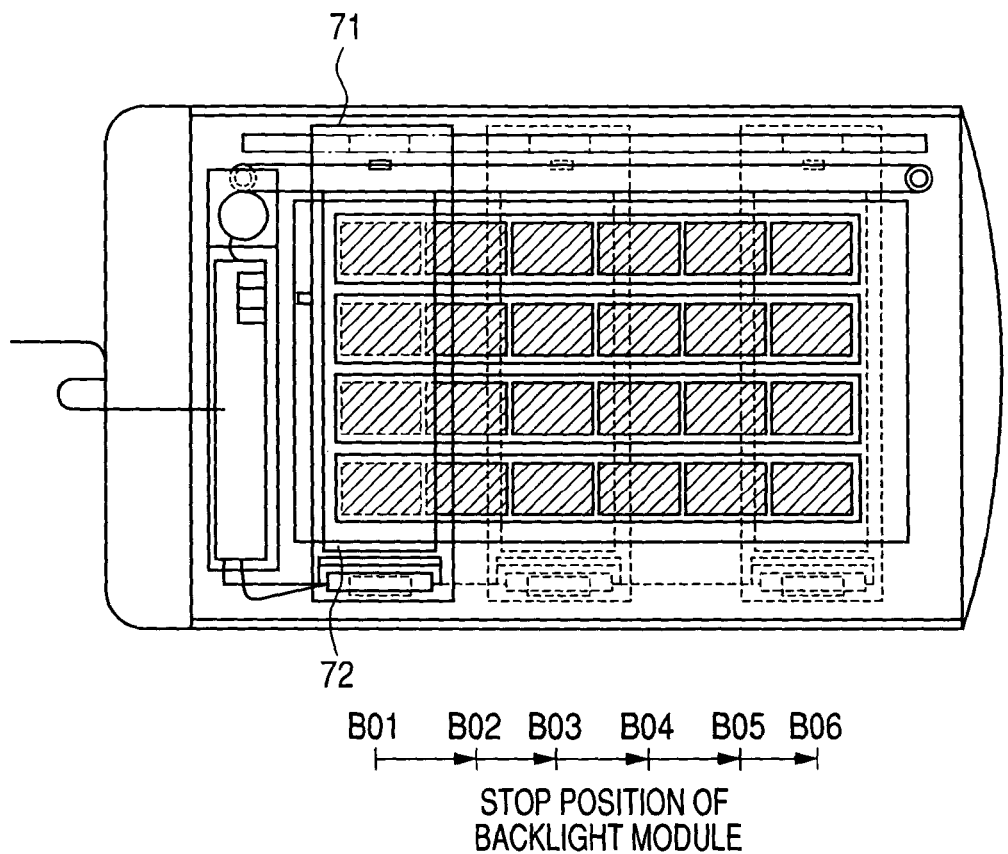
FIGS. 3A and 3B illustrate a second embodiment of the present invention.
Figure 3B:
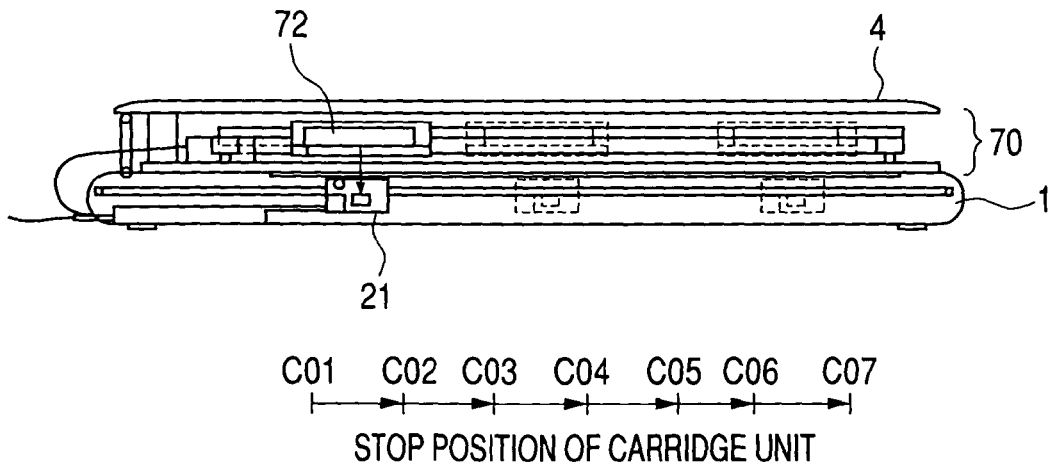
Figure 4:
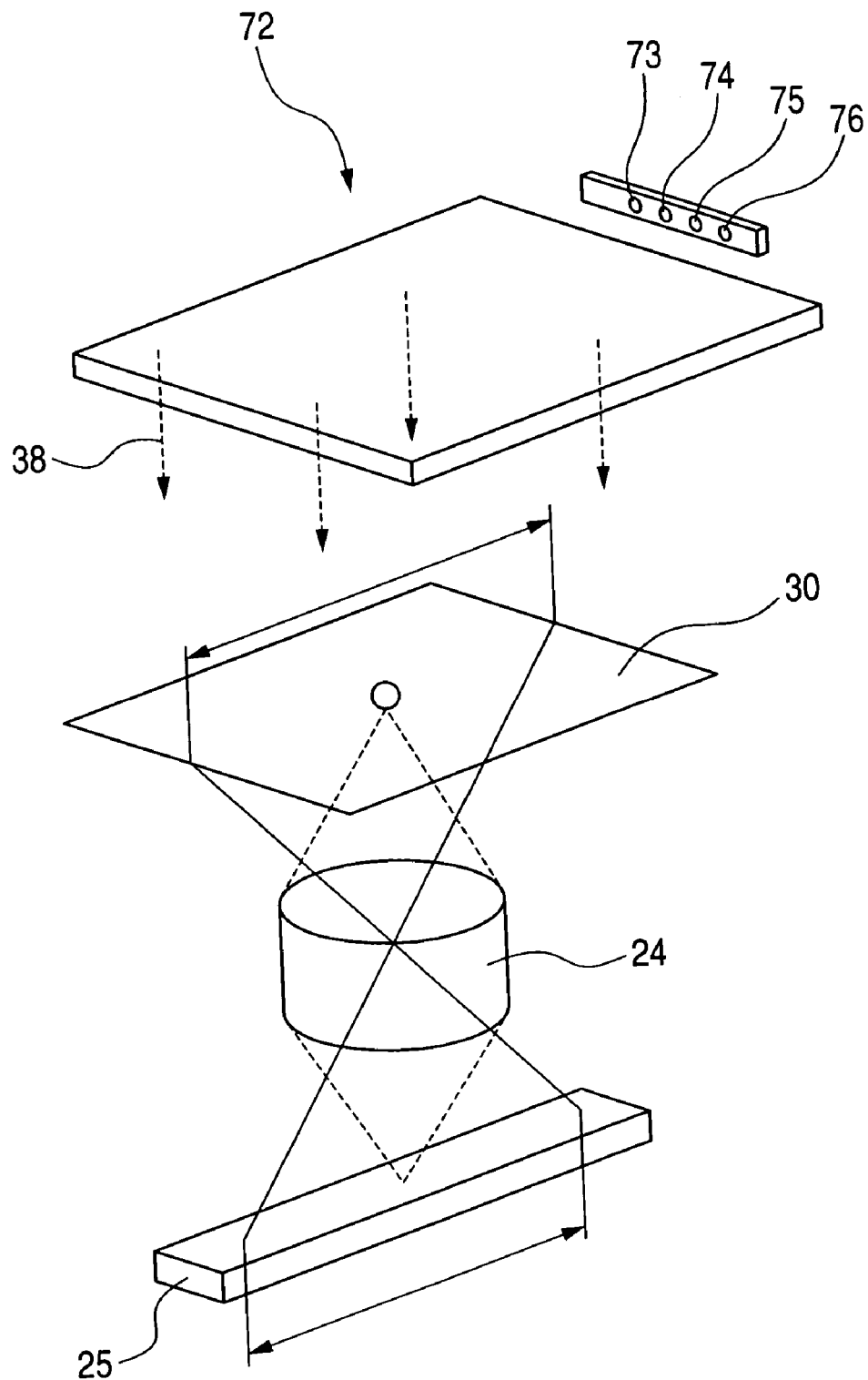
FIG. 4 is a schematic perspective view showing a back light unit according to the second embodiment of the present invention.

In the following, the second embodiment of the present invention will be described with reference to FIGS. 3A, 3B and 4. FIGS. 3A and 3B are, respectively, a top view and a side view of an image reading apparatus, and FIG. 4 is a schematic diagram thereof. In contrast to the first embodiment that uses the lamp for transparent original reading 53 and the LEDs 54 as light sources for the backlight unit, the second embodiment uses an LED back light unit 72 that has a red LED, a green LED, a blue LED and an infrared LED, and the second embodiment is adapted to guide light into a surface area utilizing a light guide plate. The back light unit 72 is moved along the sub scanning direction by means of an LED back light carriage 71. Furthermore, in contrast to the first embodiment in which the transparency unit 50 is disposed on the image reading apparatus 1 as transparency unit A, in the second embodiment, a transparency unit B designated by reference numeral 70 is disposed between a pressure plate for reflective originals 4 and a original table 6 of the image reading apparatus 1.

Moreover, in contrast to the first embodiment in which the reduction optical system carriage 11 is used in the original reading portion of the image reading apparatus 1, the second embodiment uses a CIS carriage 21 on which a contact image sensor (which will be referred to as the CIS hereinafter) having an LED light source for reflective original composed of LEDs of three colors of red, green blue and a light guide member for guiding light from the LEDs onto an original as linear light, a rod lens array 24 and a monochromatic line sensor 25 is mounted. The position of the monochromatic line sensor 25 relative to the LEDs of three colors is not limited to the position shown in FIG. 4, but the main scanning direction of the monochromatic line sensor 25 may be perpendicular to that shown in FIG. 4.

The reading operation in this embodiment is the same as that in the first embodiment, but it is possible to further reduce electric power consumption required at one time by turning on the respective color LEDs of the LED back light unit 72 sequentially. In addition, by using the CIS sensor and CIS carriage 21 that are low-profile, it is possible to reduce the overall size of the apparatus. The red LED 73, the green LED 74 and the blue LED 75 can be replaced by white LEDs. In such cases, a monochromatic sensor that can read three colors simultaneously is used.

Third Embodiment

Figure 5A:
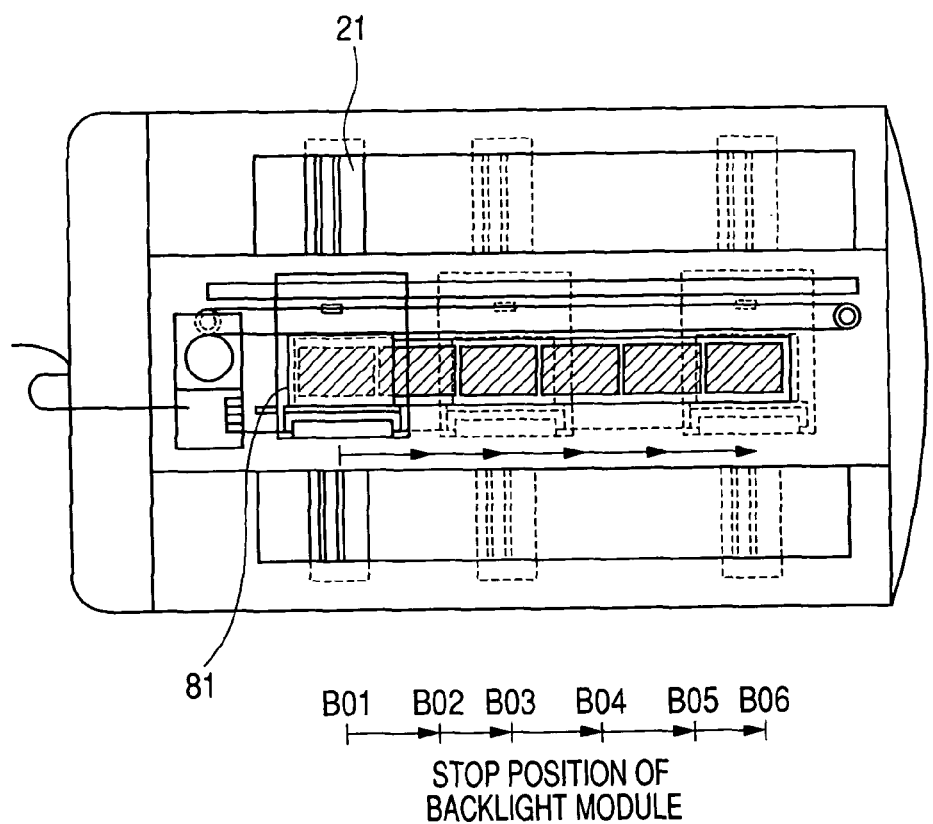
FIGS. 5A and 5B illustrate a third embodiment of the present invention.
Figure 5B:
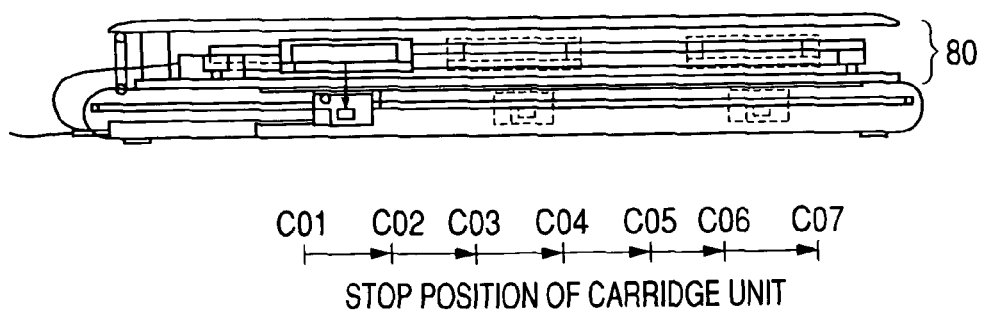

The third embodiment of the present invention will be described with reference to FIGS. 5A and 5B. In the first and second embodiments, the surface illumination area of the back light unit 11 and the LED back light unit 71 is designed to have a length along the main scanning direction covering four 35 mm films and a length along the sub scanning direction a little larger than length of the longer side of the image area of one frame of a 35 mm film so that four 35 mm film strips each including six frames arranged side by side can be read. This third embodiment uses a transparency unit C designated by reference numeral 80, in which a small-size LED back light 81 designed to have a length along the main scanning direction a little larger than the length of the shorter side of the image area of one frame of a 35 mm film is used.

The reading operation in this embodiment is the same as that in the first and second embodiments, but it is possible to further reduce electric power consumption by using the small-size back light unit 81, and image reading is made possible even with a power source of a limited electric power, such as power supply through a USB.

Fourth Embodiment

The fourth embodiment of the present invention will be described with reference to FIGS. 6A to 8B.

Figure 6A:
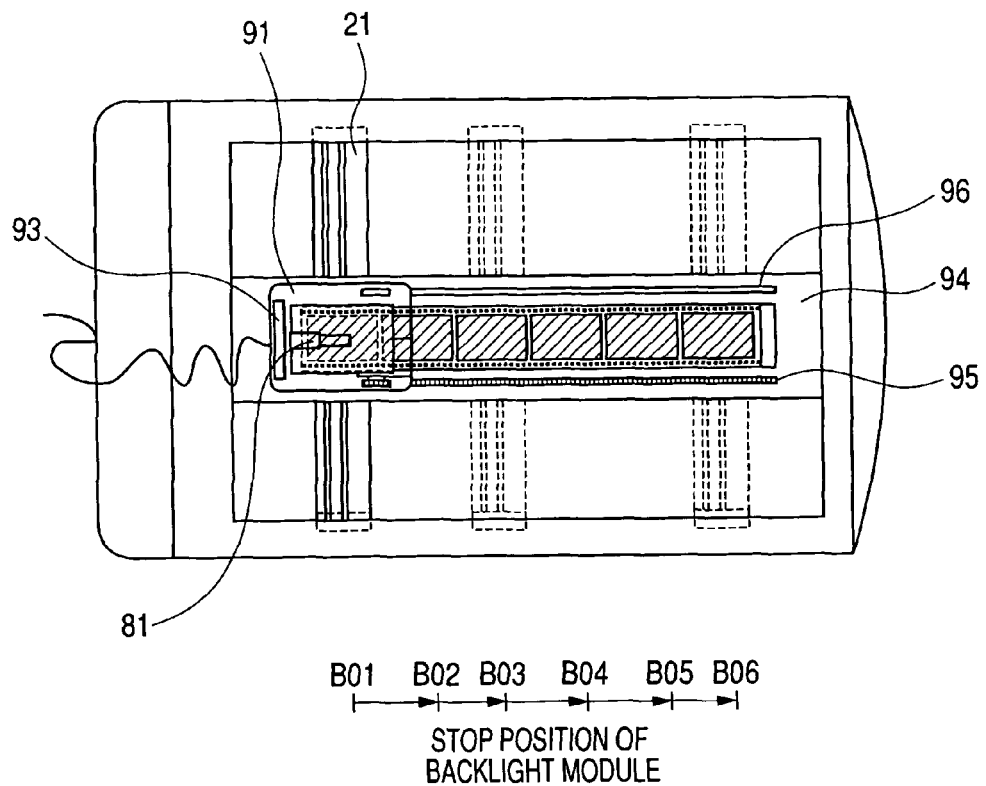
FIGS. 6A and 6B illustrate a fourth embodiment of the present invention.
Figure 6B:
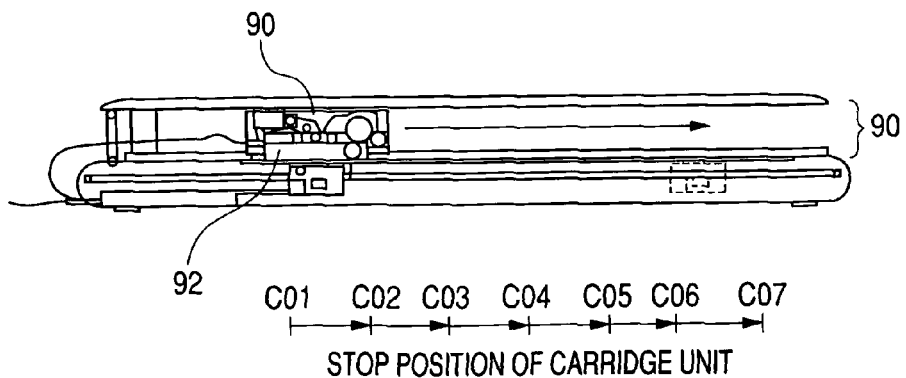

FIGS. 6A and 6B are, respectively, a top view and a side view showing an image reading apparatus according to this embodiment. In contrast to the third embodiment shown in FIGS. 5A and 5B, a transparency unit D designated by reference numeral 90 in this embodiment has a self-propelled back light carriage 91 on which a back light unit 92 and a driving unit for scanning 100 are mounted. In addition, a back light biasing unit 105 is also mounted on it.

A transparent original 30 is set in a frame of a film guide 94 placed on the original table 6. The film guide 94 is further provided with a rack 95 and a guide groove 96. The back light carriage 91 is set on the rack 95 and the guide groove 96. The back light carriage 91 can be translated along the rack 95 and the guide groove 96.

A circuit board for transparency unit 93 fixed on the back light carriage 91 is adapted to communicate with the image reading apparatus 1 through the main body connection cable 44. The circuit board for transparency unit 93 is also adapted to control the back light unit 92, the driving unit for scanning 100 and the back light biasing unit 105 through a connection cable that is not shown in the drawings. The driving unit for scanning 100 and the back light biasing unit 105 are shown in FIGS. 7A and 7B. The back light unit 92 uses LEDs as the light source as with that in the second and third embodiments. The image reading apparatus 1 is equipped with a carriage 21 on which a CIS sensor is mounted as with that in the second and third embodiments.

FIG. 7A is a side view for illustrating movement of the back light carriage 91. The driving unit for scanning 100 is composed of a driving motor 101, the first gear 102, the second gear 103 and the third gear 104. When the driving motor 101 rotates in the direction indicated by arrow M as shown in FIG. 7A, the back light carriage 91 moves in the frontward direction A. When the driving motor 101 rotates in the direction indicated by arrow M' as shown in FIG. 7B, the back light carriage 91 moves in the backward direction A'.

Figure 8A:
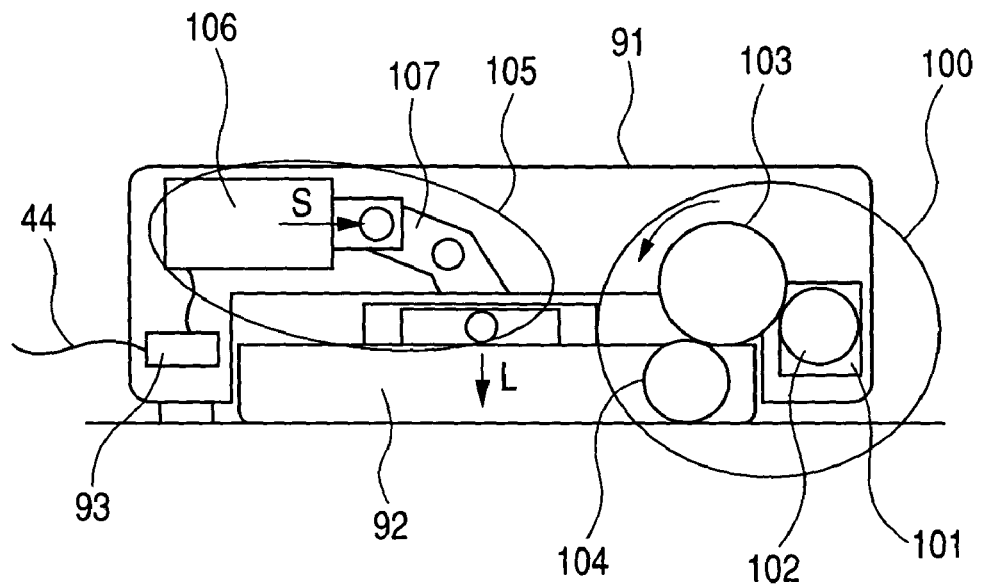
FIGS. 8A and 8B illustrate a structure for upward and downward movement of the back light carriage according to the fourth embodiment of the present invention.
Figure 8B:
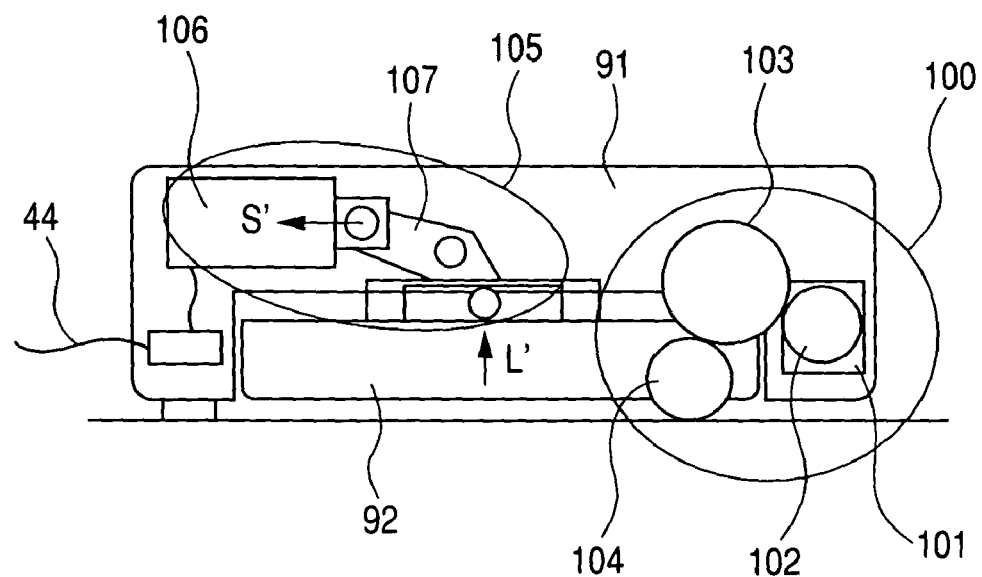
Figure 9A:
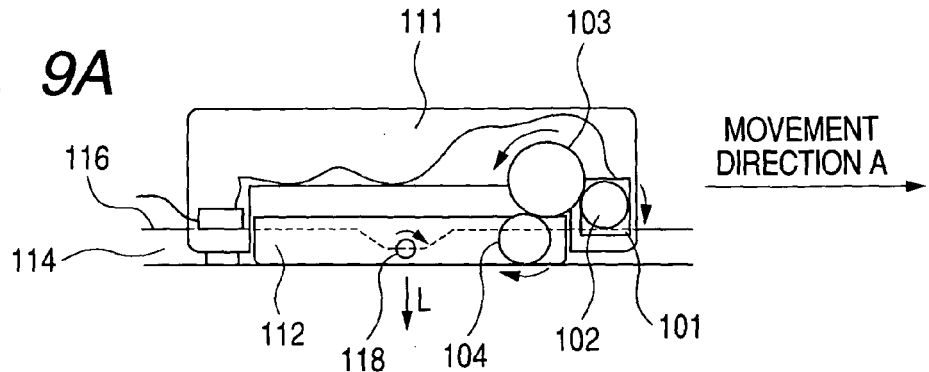
FIGS. 9A, 9B, 9C and 9D illustrate movement of a back light carriage along the sub scanning direction and a structure for upward and downward movement of the back light carriage according to a fifth embodiment of the present invention.
Figure 9B:
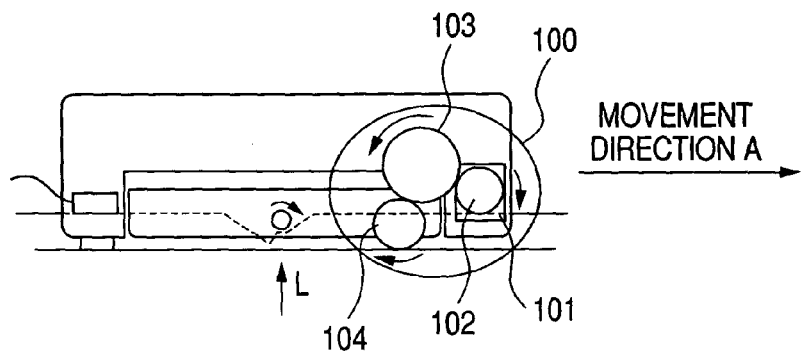
Figure 9C:
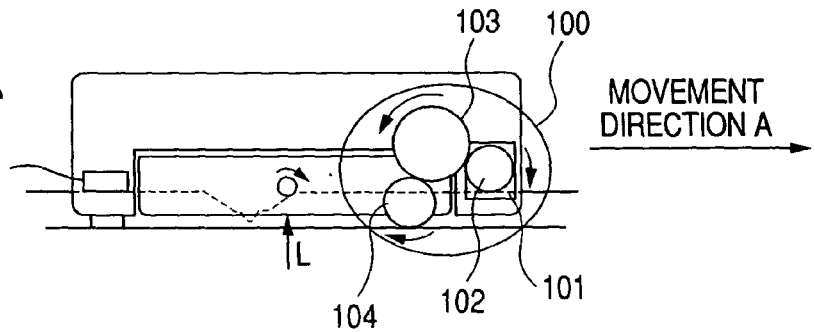
Figure 9D:
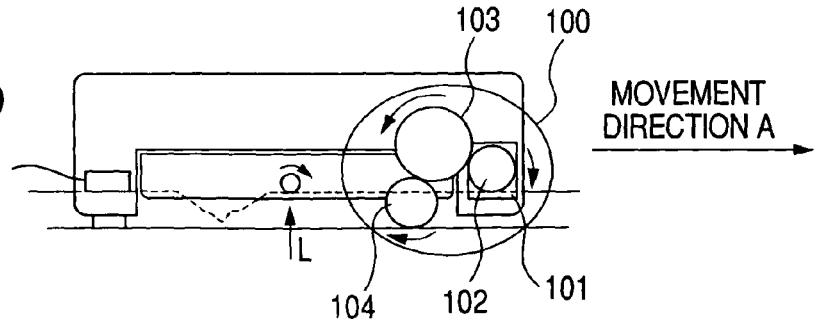
Figure 10A:
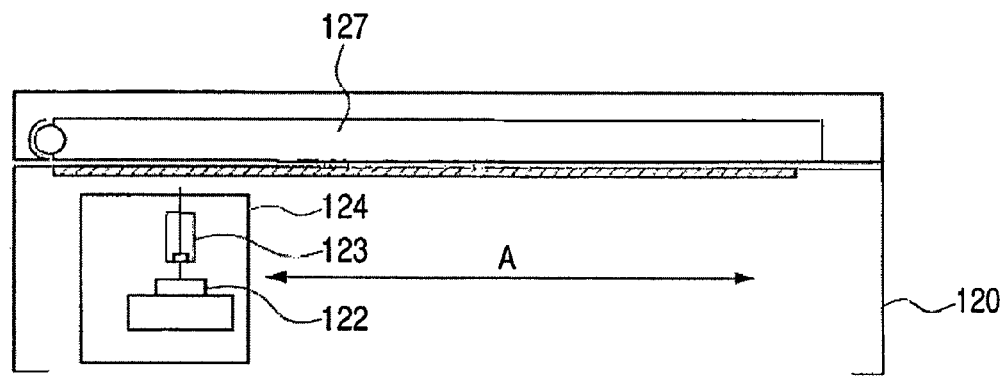
FIGS. 10A and 10B illustrate a surface light source according to a prior art.
Figure 10B:
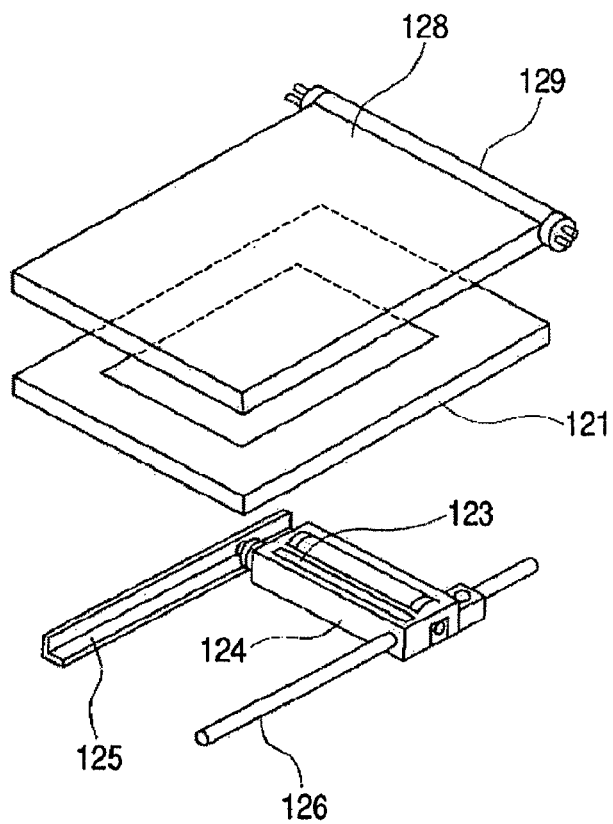
Figure 11A:
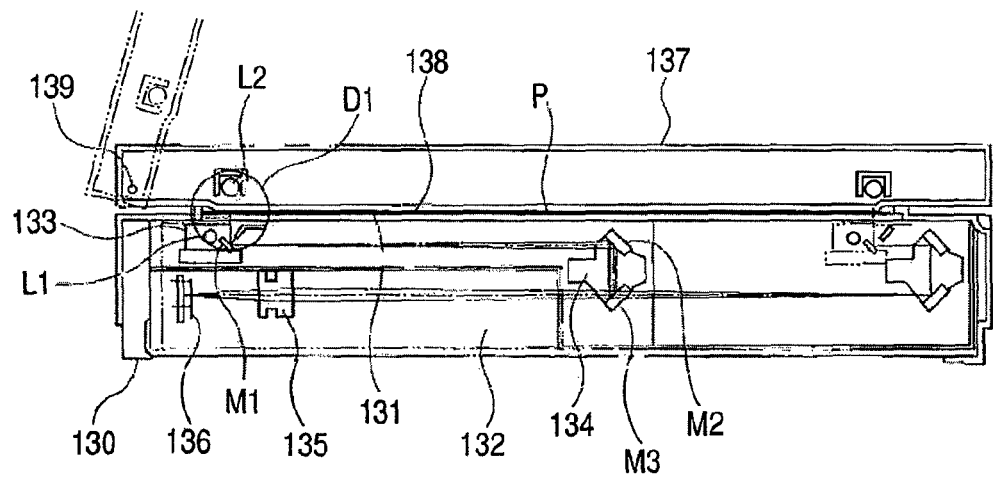
FIGS. 11A and 11B illustrates a linear moving light source according to a prior art.
Figure 11B:
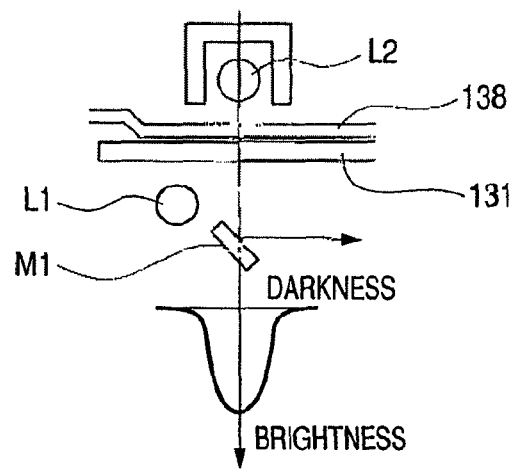
Figure 12:
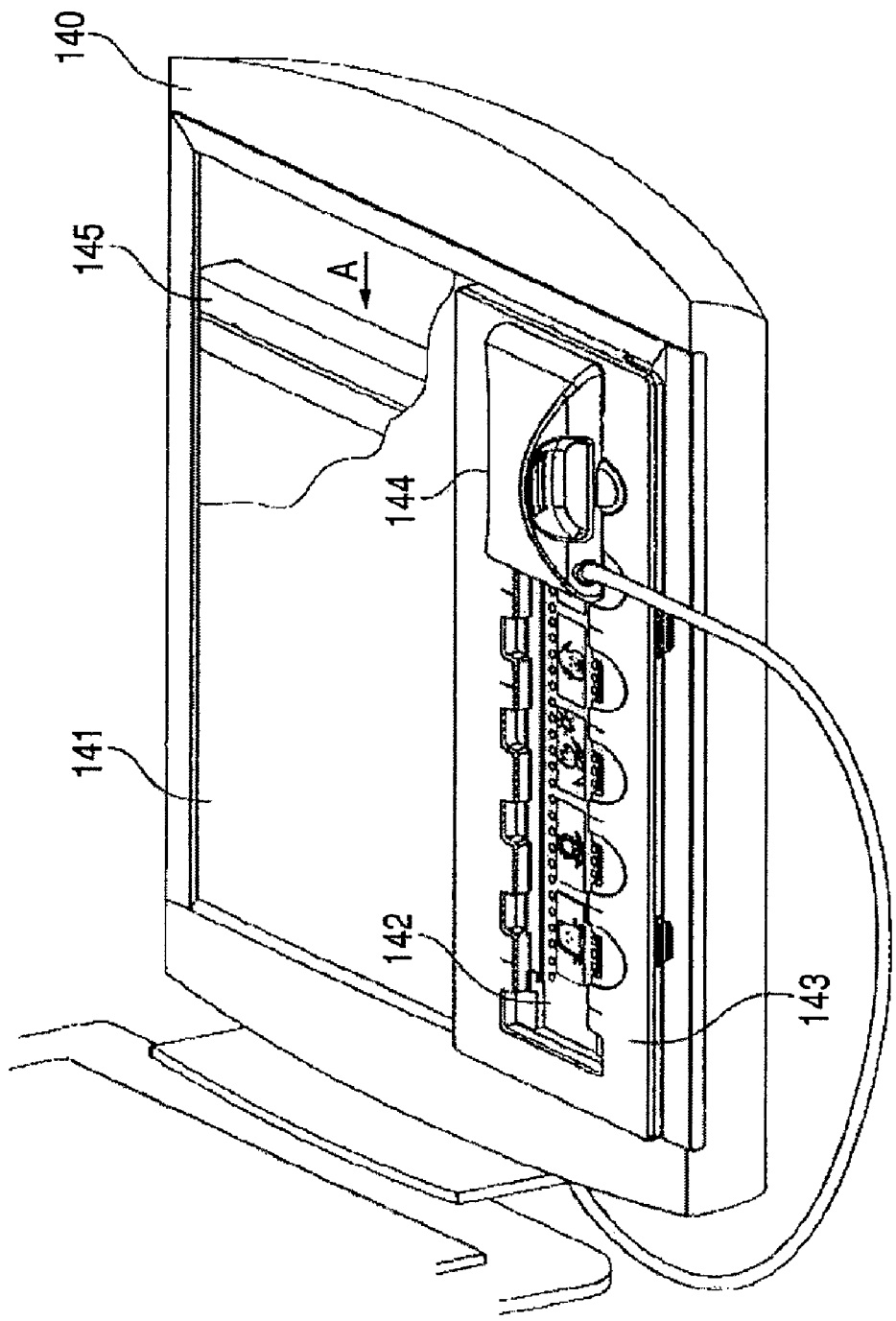
FIG. 12 illustrates a small-size surface light source according to a prior art.

FIGS. 8A and 8B are side views for illustrating movement of the back light unit 92 mounted on the back light carriage 90.

The back light biasing unit 105 is composed of a solenoid 106 and an arm 107 and connected with the back light unit 92. When the solenoid 106 extends in the direction indicated by arrow S as shown in FIG. 8A, the back light unit 92 is pressed down by the arm 107 in the direction indicated by arrow L. When the solenoid 106 collapses in the direction indicated by arrow S' as shown in FIG. 8B, the back light unit 92 is pulled up by the arm 107 in the direction indicated by arrow L'.

The back light carriage 91 moves from an initial standby position to position B01 corresponding to the center of the image area 31 of the first frame of the transparent original 30 with the back light unit 92 being pulled up by the back light biasing unit 105. After that, the back light biasing unit 105 presses the back light unit 92 down to bias the transparent original 30.

The CIS carriage 21 moves from an initial position to position C01 corresponding to the start position of image area 31, and then moves to position C02 corresponding to the end position of image area 31 while performing reading. During this movement, the red LED 73, the green LED 74, the blue LED 75 and the infrared LED 76 of the back light unit 11 are sequentially turned on, and surface light 38 thus emitted is transmitted through the transparent original 30, passes through the rod lens array 24 and reaches the CMOS sensor 25, by which the light is converted into an output signal.

The output signal is transferred to the main body circuit board 2 so as to be converted into image information, and then output to a device such as a computer via the interface cable 5. By the above-described series of operations, image information of image area 31 can be read.

In the time while the CIS carriage 21 is at the end position C02 of image area 31 and image information is being transferred, the back light carriage 91 pulls up the back light unit 92 again to release the bias and moves to position B02 corresponding to the center of the next image area 32.

After the back light unit 92 has been pressed down again and the transfer of the image information has been completed, the CIS carriage 21 is moved to position C03 that corresponds to the end position of image area 32, and image information is read during this movement. Image information of image area 33, image area 34, image area 35 and image area 36 can be read by repeatedly performing the same operation for the respective image areas.

Fifth Embodiment

FIGS. 9A to 9D are side views illustrating a transparency unit E 110 according to the fifth embodiment. The transparency unit E 110 has a film guide 114 with a guide groove 116 having uneven features in place of the film guide 94 with the guide groove 96 in the fourth embodiment. In addition, a rotating member 118 mounted on a back light unit 112 is adapted to slide on the guide groove 116. The back light unit 112 uses LEDs as with the third embodiment. The rotating member 118 mounted on the back light unit 112 moves up and down in accordance with unevenness of the guide groove 116, and the back light unit 112 also goes up and down accordingly. In this embodiment, the lowest portions in the unevenness are provided at multiple positions corresponding to image areas 31 to 36.

A 35 mm negative film is typically cut to a film strip including 6 consecutive frames. In the case of the film guide 114 adapted for this film strip, by providing recessed portions at six positions corresponding to the center of the frames, it is possible to bias the film at the center of each frame. In the other areas, the back light carriage 111 travels on not-recessed portions, so that the back light unit is retracted upwardly. Thus, the film surface can be prevented from being damaged by the back light unit 112.

Sixth Embodiment

Figure 13A:
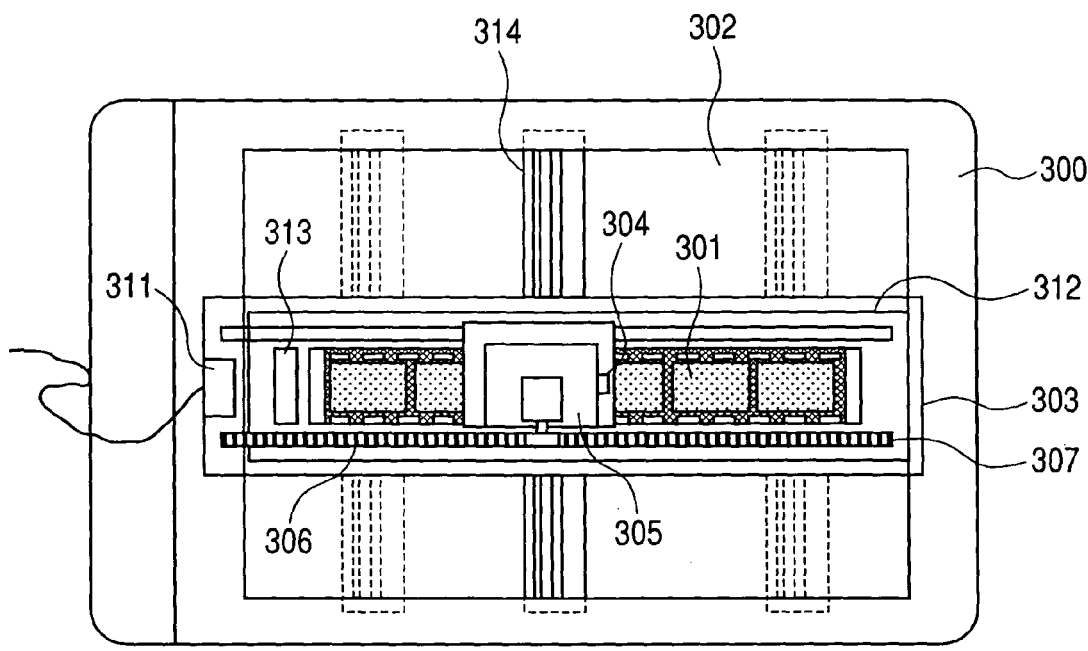
FIGS. 13A and 13B illustrate a sixth embodiment of the present invention.
Figure 13B:
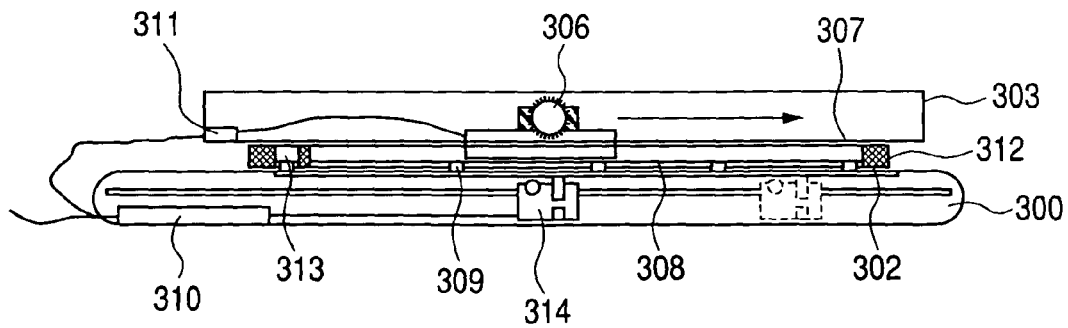

FIGS. 13A and 13B are a top view and a side view showing an image reading apparatus 300 on which a transparency unit 303 is placed according to the sixth embodiment respectively. In the image reading apparatus and the transparency unit according to this embodiment, a light diffusion plate 308 covering all the images of six frames of a photographic film strip as a transparent original is added to the arrangement of the above-described fourth embodiment. In addition, a correction window 313 on which the transparent original is not to be set is provided. The light diffusion plate also covers the correction window 313, and the back light unit moves on the light diffusion plate 308. Since the back light unit moves on the light diffusion plate that covers the photographic film, this embodiment does not have the back light biasing unit that is provided in the fourth embodiment. As shown in the top view of FIG. 13A, when a transparent original 301 such as a photographic film is to be read, a transparency unit 303 is set on the original table 302. The transparency unit 303 includes a light source portion 304 having light emitting diodes (which will be referred to as LEDs hereinafter) emitting red light, green light, blue light and infrared light respectively, a light guide portion 305 for guiding illumination light from the light source portion 304 to form uniform surface light, a light source driving portion 306 for moving the light source portion 304 and the light guide portion 305 in the sub-scanning direction, a light source leading portion 307 in contact with the light source driving portion 306 for leading the light source portion 304 and the light guide portion 305 in the movement direction, a light diffusion plate 308 for diffusing light from the light guide portion 305 to illuminate the transparent original 301, an original pressing portion 309 for pressing the transparent original by a portion outside the image area against the original table to keep the height within the depth of field of a contact image sensor and a transparency unit electric circuit board 311 for transmitting a drive control signal from a main body electric circuit board 310 provided on the image reading apparatus 300 to the light source portion 304 and the light source driving portion 306. The light source driving portion 306 includes a motor for movement of transparency light source 317. The transparent original 301 is set along a film guide 312 placed on the original table 302. On the film guide 312, a correction window 313 used for correcting unevenness in light distribution of the light source and variations in the sensitivity of the image sensor etc. is formed. Illumination light from the transparency unit 303 is transmitted through the transparent original and converted into an electric image signal as image information by the CIS 314. The CIS has an LED for reflective originals. In addition, the CIS is driven for scanning along the surface of the original by a motor for movement of CIS 316.

Figure 14:
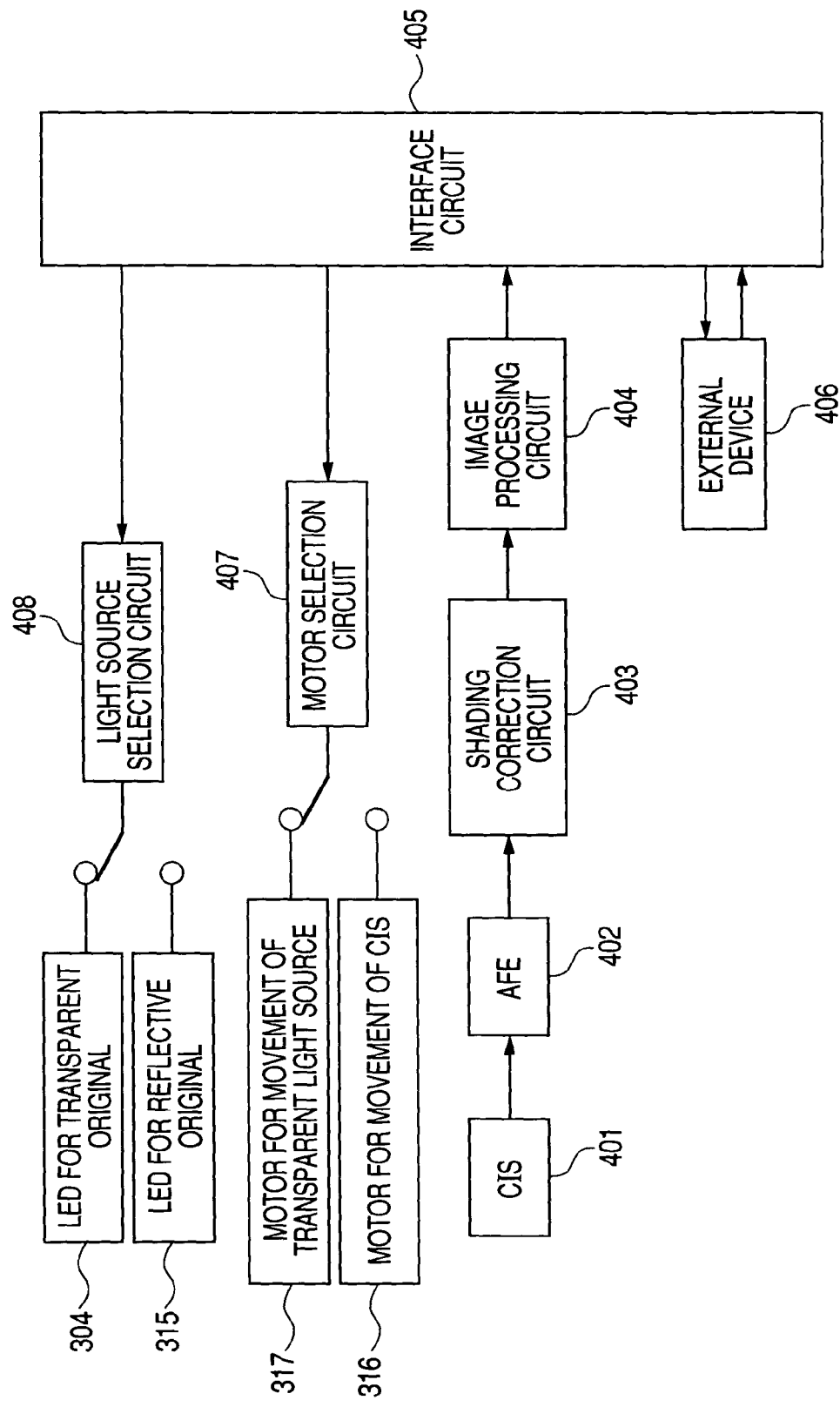
FIG. 14 is a block diagram of an electric circuit according to the sixth embodiment of the present invention.
Figure 15:
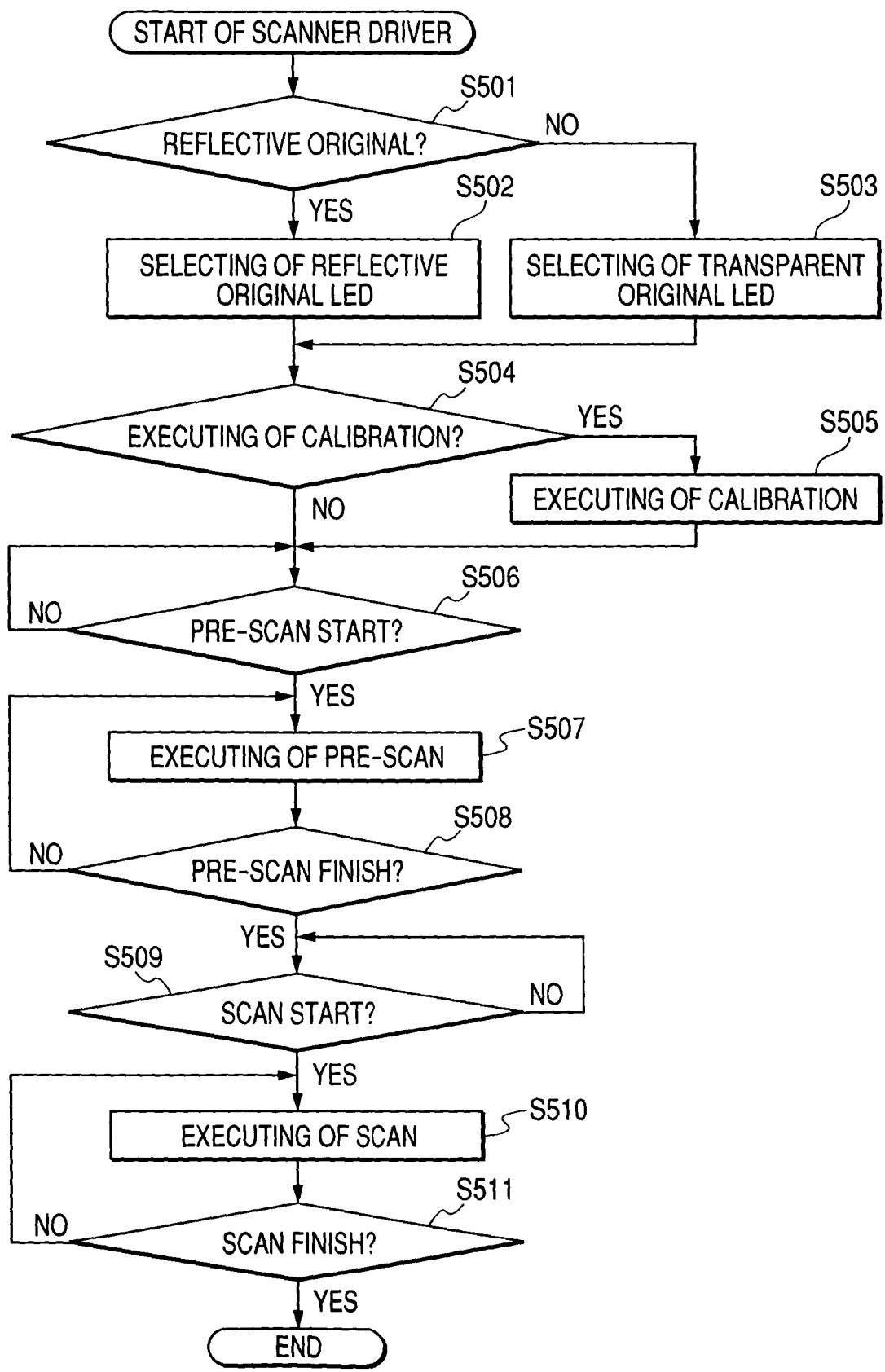
FIG. 15 is a flow chart of a control process according to the sixth embodiment of the present invention.

FIG. 14 is a block diagram showing the electric circuit arrangement of this embodiment. FIG. 15 is a flow chart of a control sequence.

In the following, a specific operation of reading a transparent original according to this embodiment will be described with reference to FIGS. 13A to 15.

When a power is turned on and initialing is completed, the image reading apparatus waits for a command from a scanner driver of software stored in a external apparatus 406 shown in FIG. 14. When the scanner driver is activated, a determination is firstly made in step S501 of FIG. 15 as to the type of the original. The determination of the original type may be performed by user's entry of the original type or by reading a part of the original using transmitted light and reflected light. If it is determined in step S501 that the original is a reflective original, the process proceeds to step S502, where the LED for reflective originals is selected and controlled by a light source selection circuit 408.

On the other hand, if it is determined in step S501 that the original is a transparent original, the process proceeds to step S503, where the LED for transparent originals is selected and controlled.

Next, in step S504 a determination is made as to whether calibration for correcting unevenness in the light distribution of the light source and variations in the sensitivity of the image sensor is to be executed or not. In the case where the user does not command execution of the calibration, necessity of executing calibration is determined based on, for example, whether correction data is stored in the external device 406 or on the number of times the reading operation has been performed. If execution of the calibration is selected in step S504, the calibration operation is executed in step S505. Firstly, the motor for movement of transparency light source 317 is selected by a motor selection circuit 407 shown in FIG. 14, and the light source driving portion 306 shown in FIGS. 13A and 13B is made to operate to move the light guide portion 305 to position D0 corresponding to the correction window 313. Then, the motor for movement of CIS 316 is selected by the motor selection circuit 407, and the CIS 314 is moved to position C0 corresponding to the correction window as with the light source. Then, the LEDs of the respective colors are sequentially turned on, and data obtained is stored as correction data.

Figure 16:
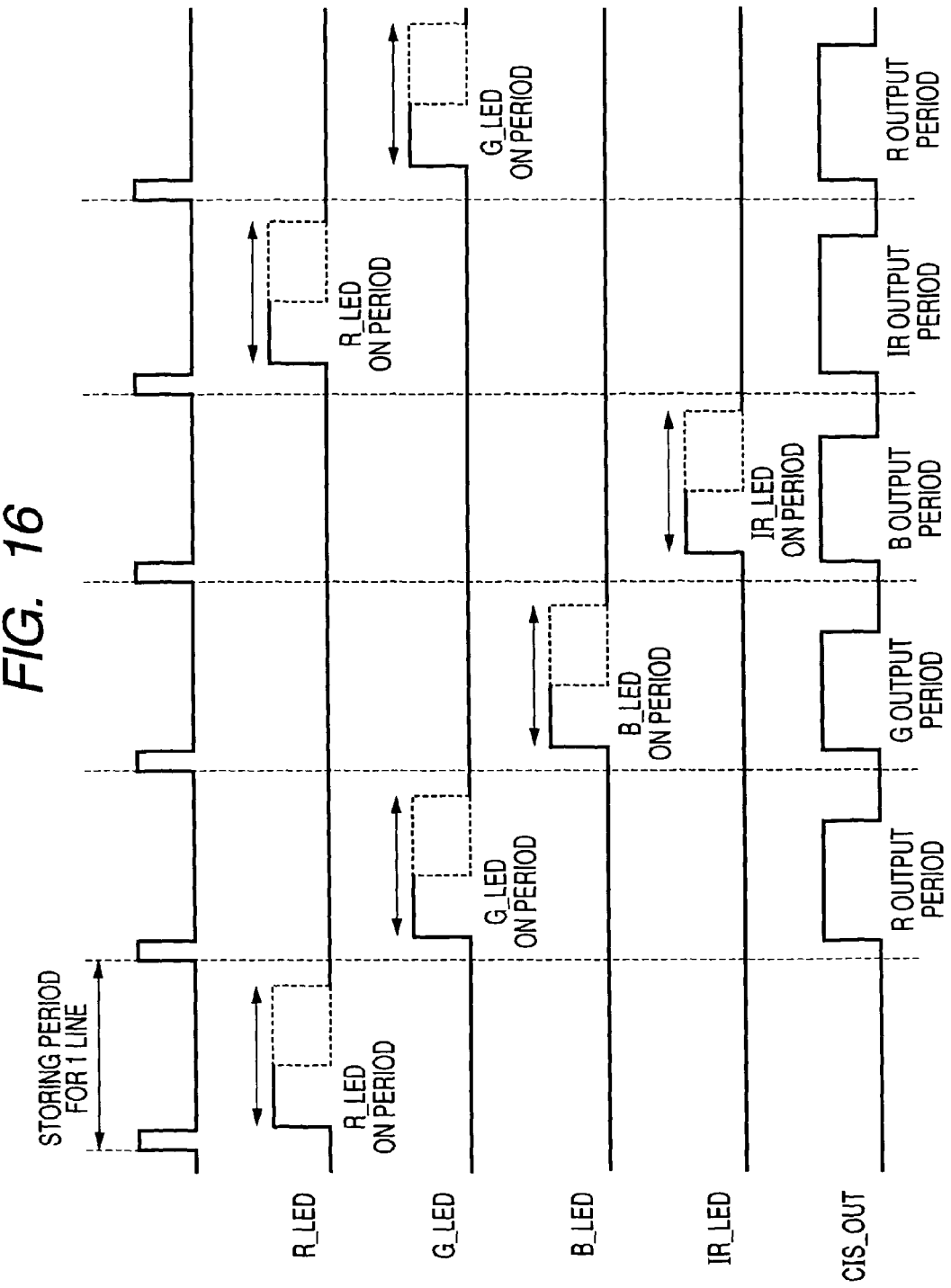
FIG. 16 is a timing chart indicating a LED ON timing and period.

Next, in step S506, the process waits for a command for starting pre-scan. Here, it is possible to designate the frames for which pre-scan is to be performed. When a command for starting pre-scan is made, pre-scan is performed in step S507. Firstly, the motor for movement of transparency light source 317 is selected in the motor selection circuit 407 shown in FIG. 14, and the light source driving portion 306 shown in FIGS. 13A and 13B is made to operate to move the light guide portion 305 to position D1 at which the light guide portion 305 covers the image of the first frame. Then, the motor for movement of CIS 316 is selected by the motor selection circuit 407. Thus, the CIS 314 is moved to position C1 corresponding to the front end of the first frame, and then an operation for reading the first frame is started. In the reading sequence, as shown in a time chart in FIG. 16, the R-LED is turned on to illuminate the transparent original with R-LED light, and light transmitted through the original to be read 301 is accumulated in a monochromatic image sensor. Upon lapse of storing time for one line, the G-LED is turned on next. In the meantime, a read signal corresponding to one line along the main scanning direction for color R stored earlier is output as an output signal from the monochromatic image sensor. In a similar manner, a signal for color G is output during the storing time in which the B-LED is on, a signal for color B is output during the storing time in which the IR-LED is on, and a signal for IR component is output during the storing time in which the R-LED is on, so that the signals are processed as line sequential output signals. Among the data obtained by the above-described read sequence, the output data for R, G and B is processed as image data, and the output data for IR is used for detecting dusts and scratches on the original to process the image data for R, G and B. Thus, an excellent image from which dusts and scratches have been removed can be obtained by a single reading operation.

Next, a flow of processing of read image data will be descried with reference to FIG. 14. AFE 402 is an analogue front end processor that performs processing such as amplification, DC offset correction, and A/D conversion on electric signals output from the CIS 401 to finally output digital image data in, for example, 16 bits. A shading correction circuit 403 stores data of direct transparent original light source as shading correction data and corrects image data generated by reading the original to be read using the correction data. After the shading correction data is obtained, the data is recorded in the external device 406, and data needed upon scanning is downloaded to the image reading apparatus of this embodiment to execute processing. An image processing circuit 404 performs predetermined processing, such as gamma conversion and packing in accordance with the image reading mode (for example, binary or 24 bits multi-value etc.) designated by the external device in advance, on the image data. The interface circuit 405 is adapted to receive control signals from and to output image signals to the external device 406 such as a personal computer functioning as a host apparatus of the image reading apparatus according to this embodiment. The external apparatus 406 is a host computer equipped with a scanner driver, or software for controlling the image reading apparatus. The external device 406 constitutes, together with the image reading apparatus, an image processing system.

The scanner driver has an interface for allowing a user to designate the image reading mode, the resolution, and the area to be read, and is adapted to send control signals based on the respective designations to the image reading apparatus through the aforementioned interface circuit 405. The scanner driver is also adapted to send a reading start command etc. Furthermore, the scanner driver sequentially processes the image data that has been read by the image reading apparatus in accordance with the aforementioned control signals to display it on a screen.

Next, in step S508, a determination is made as to whether reading of the lines corresponding to a designated frame number has been completed or not. If the reading of the designated lines has not been completed, the contact image sensor 314 is moved in the sub scanning direction by an amount corresponding to one line, and signals of the respective colors R, G, and B are read. In connection with this, if the designated number of lines corresponds to the first and second frames, The motor for movement of CIS is once stopped after completion of reading of the first frame; the light guide portion 305 in the transparency unit 305 is moved to position D2 corresponding to the second frame; then the reading operation is restarted.

If it is determined in step S508 that reading of the designated number of lines has been completed, the result is displayed on a monitor connected to the external device 406, and the process waits for a command for starting scan in step S509.

When scan is started in step S509, data processing in accordance with the designated frames and scanning resolution is performed in step S510. A determination is made in step S511 as to whether reading of the designated number of lines has been completed or not, and if the designated number of lines have been read, scan is terminated.

(Other Modes)

The foregoing descriptions have been directed to cases where the surface light source has a size that covers one of a plural images. A so-called 35 mm film is typically cut every six frames. In view of integration of variations of approximately 2 mm in the five intervals between the images and displacement in the film set position, it is preferred that the length along the longitudinal direction of the surface light source be approximately 1.5 times the length of the image, that is, in the range around 56 mm. When the length of the surface light source is larger than or equal to 72 mm or twice the length of the image, illumination will become dark. When the length of the surface light source is smaller than or equal to 40 mm or the image length including the frame intervals on its both sides, variations and displacement cannot be absorbed.

In the above-described first and second embodiments, images of 24 frames can be set simultaneously, and in the third to fifth embodiments, images of 6 frames can be set simultaneously. It is possible to designate the images to be read from among the images of these multiple frames using a user interface of a computer connected to the image reading apparatus. Based on the designation, the image reading apparatus can automatically control to read the designated images sequentially.

This application claims priority from Japanese Patent Application Nos. 2004-174061 filed on Jun. 11, 2004 and 2005-166755 filed on Jun. 7, 2005, which are hereby incorporated by reference herein.

What is claimed is:

1. An image reading apparatus comprising:
   a transparent plate adapted to support an original thereon;
   a reading unit adapted to read the original supported on said transparent plate through the transparent plate;
   a first moving mechanism adapted to move said reading unit to scan said original;
   an illuminating unit equipped with a visible light source and an infrared light source to illuminate said original; and
   a second moving mechanism adapted to move said illuminating unit, and having a drive source configured to move said illuminating unit and a drive controlling circuit configured to control said drive source,
   wherein said original is a transparent original film including a plurality of images,
   said illuminating unit has an area of light emitting surface adapted to illuminate an area having a size covering one image area of said transparent original film, and
   said second moving mechanism is controlled by said drive controlling circuit and is adapted to keep, while said reading unit is reading one image of said transparent original film to obtain a visible image signal and an infrared image signal of the one image, said illuminating unit at a position at which said illuminating unit illuminates a whole area of said one image and to move, after completion of reading of the one image of said transparent original film by said reading unit, said illuminating unit to a position at which said illuminating unit illuminates a whole area of another image of said transparent original film.

2. The image reading apparatus according to claim 1, further comprising:
   a biasing mechanism for biasing said transparent original film against said transparent plate by means of said illuminating unit; and
   a bias releasing mechanism for releasing, when said illuminating unit is moved by said second moving mechanism, bias applied by said biasing mechanism.

3. The image reading apparatus according to claim 1, further comprising:
   a drive circuit for selectively driving said first moving mechanism and said second moving mechanism.

4. An illuminating apparatus for illuminating a plurality of images on a transparent original film placed on a transparent plate of an image reading apparatus, said illumination being from a side opposite to said transparent plate on which the transparent original film is placed, comprising:
   an illuminating unit equipped with a visible light source and an infrared light source to illuminate said transparent original film; and
   a moving mechanism adapted to move said illuminating unit, and having a drive source configured to move said illuminating unit and a drive controlling circuit configured to control said drive source,
   wherein said illuminating unit has an area of a light emitting surface adapted to illuminate an area having a size covering one image area of said transparent original film, and said moving mechanism is controlled by said drive controlling circuit and is adapted to keep, while said image reading apparatus is reading one image of said transparent original film to obtain a visible image signal and an infrared image signal of the one image, said illuminating unit at a position at which said illuminating unit illuminates a whole area of said one image and to move, after completion of reading of the one image of said transparent original film by said image reading apparatus, said illuminating unit to a position at which said illuminating unit illuminates a whole area of another image of said transparent original film.

5. The illuminating apparatus according to claim 4, wherein said illuminating unit has an illumination area having a size adapted to illuminate a plurality of images arranged along a direction perpendicular to the direction of said movement.

6. The illuminating apparatus according to claim 4, further comprising:
   a light diffusion plate provided between said illuminating unit and said transparent original film for covering said transparent original film having a plurality of images.

7. The illuminating apparatus according to claim 4, further comprising:
   a biasing mechanism for biasing said transparent original film against said transparent plate by means of said illuminating unit; and
   a bias releasing mechanism for releasing, when said illuminating unit is moved by said moving mechanism, bias applied by said biasing mechanism.

8. The illuminating apparatus according to claim 4, wherein said illuminating unit is equipped with a drive source for said moving mechanism.

9. The illuminating apparatus according to claim 7, wherein said illuminating unit is equipped with a drive source that is switched between enabling and disabling biasing by said biasing mechanism.

10. The illuminating apparatus according to claim 7, wherein enabling and disabling of biasing by said biasing mechanism is switched interlocked with movement of said illuminating unit.

11. The illuminating apparatus according to claim 4, wherein said illuminating unit is equipped with a plurality of semiconductor light sources of more than three different colors.

12. A method of controlling an image reading apparatus that illuminates a plurality of images on a transparent original film placed on a transparent original table by means of an illuminating unit having a moving mechanism for movement along said transparent original table, said moving mechanism having a drive source for said movement and a drive controlling circuit configured to control said drive source, and reads an image through said transparent original table while moving a reading portion in a scanning manner, comprising:
   a reading step of reading a whole area of one image included in said transparent original film by means of said reading portion while illuminating the whole area of the image by the illuminating unit having an illumination area covering said one image area, the illuminating unit being kept stationary, said reading step comprising an image reading process of illuminating said transparent original film by means of said illuminating unit having a visible light source and an infrared light source and obtaining a visible image signal and an infrared image signal of an image included in said transparent original film;

a defective information correction step of processing said visible image signal and said infrared image signal to correct a defective image signal in said visible image signal caused by a defect present in said transparent original film; and a moving step of, by controlling said moving mechanism by said drive controlling circuit, moving said illuminating unit to a position at which said illuminating unit illuminates a whole area of another image among said plurality of images, wherein said reading step and said moving step are performed repeatedly until a predetermined number of times of said reading step is completed.

13. The method according to claim 12, wherein said reading step further includes a step of biasing said transparent original film against said transparent original table by means of the surface illuminating unit, and said moving step further includes a step of releasing said bias.

14. The method according to claim 12, wherein said predetermined number of times is the number of the images included in said transparent original film.

15. The method according to claim 12, further comprising:
a read image designation step of designating an image(s) to be read from said transparent original film that includes a plurality of images.

16. The method according to claim 15, wherein said predetermined number of times is the number of the images to be read from said transparent original film designated in said read image designation step.

17. The method according to claim 15, wherein said another image is included in the images to be read from said transparent original film designated in said read image designation step.

18. A non-transitory computer-readable medium having a computer-executable program stored therein, the program implementing a method of controlling an image reading apparatus by illuminating a plurality of images on a transparent original film placed on a transparent original table by means of an illuminating unit having a moving mechanism for movement along said transparent original table, said moving mechanism having a drive source for said movement and a drive controlling circuit configured to control said drive source, and reading an image through said transparent original table while moving a reading portion in a scanning manner, comprising:

a reading step of reading a whole area of one image included in said transparent original film by means of said reading portion while illuminating the whole area of the image by the illuminating unit having an illumination area covering said one image area, the illuminating unit being kept stationary, said reading step comprising an image reading processor illuminating said transparent original film by means of said illuminating unit having a visible light source and an infrared light source and obtaining a visible image signal and an infrared image signal of an image included in said transparent original film;

a detective information correction step of processing and said visible image signal and said infrared image signal to correct a defective image signal in said visible image signal caused by a defect present in said transparent original film; and a moving step of, by controlling said moving mechanism by said drive controlling circuit, moving said illuminating unit to a position at which said illuminating unit illuminates a whole area of another image among said plurality of images, wherein said reading step and said moving step are performed repeatedly until a predetermined number of times of reading step is completed.

\* \* \* \* \*